United States Patent [19]

Jackson et al.

[11] Patent Number: 5,762,683

[45] Date of Patent: Jun. 9, 1998

[54] FERRIC FLUOBORATE/ORGANIC EXTRACTANT HYDROMETALLURGICAL PROCESS FOR RECOVERING METALS

[75] Inventors: Jonathan S. Jackson; Michael G. King, both of Salt Lake City, Utah

[73] Assignee: ASARCO Incorporated, New York, N.Y.

[21] Appl. No.: 651,923

[22] Filed: May 21, 1996

Related U.S. Application Data

[63] Continuation-in-part of Ser. No. 353,056, Dec. 9, 1994, abandoned.

[51] Int. Cl.⁶ .................................. C22B 3/06; C22B 3/38
[52] U.S. Cl. ........................ 75/743; 205/580; 205/599; 210/638
[58] Field of Search ............................... 205/580, 599; 75/743; 210/638

[56] References Cited

U.S. PATENT DOCUMENTS

| | | | |
|---|---|---|---|
| 4,046,687 | 9/1977 | Schulze | 210/32 |
| 4,834,951 | 5/1989 | Schwab et al. | 423/24 |
| 5,039,337 | 8/1991 | Olper et al. | 75/725 |
| 5,281,336 | 1/1994 | Dalton et al. | 210/634 |
| 5,372,684 | 12/1994 | Zoppi | 205/582 |
| 5,441,609 | 8/1995 | Olper | 205/599 |

FOREIGN PATENT DOCUMENTS

| | | |
|---|---|---|
| 0 562 709 A2 | 9/1993 | European Pat. Off. . |
| 0 562 709 A3 | 9/1993 | European Pat. Off. . |

*Primary Examiner*—Melvyn Andrews
*Attorney, Agent, or Firm*—DeLio & Peterson, LLC; John J. Tomaszewski; Kenneth A. Koch

[57] ABSTRACT

A method is provided for the hydrometallurgical recovery of metal values from sources containing more than one metal of antimony, lead, copper, zinc, bismuth, tin, cadmium and other metals by leaching the metal containing source with a ferric fluoborate/fluroboric acid solution to provide a leachant metal containing solution. The leachant solution is contacted with specific organic extractants such as an organophosphoric acid ester, an alkyl salicylaldoxime and an amidobis(thiophosphoryl) compound in a series of extraction steps to separate metals based on the extractant used. The organic extractant solution is stripped of the extracted metal(s) and the metal(s) recovered. The remaining leach solution after extraction being either further treated to extract other metals or processed to provide metal values contained therein.

25 Claims, No Drawings

FERRIC FLUOBORATE/ORGANIC EXTRACTANT HYDROMETALLURGICAL PROCESS FOR RECOVERING METALS

This application is a continuation-in-part application of U.S. application Ser. No. 08/353,056, filed Dec. 9, 1994 now abandoned.

BACKGROUND OF THE INVENTION

1. Field of the Invention

This invention relates to the separation and recovery of metals from ores and other metal containing materials and, in particular, to using a ferric fluoborate solution to solubilize the metals and then to extract the metals from the fluoborate solution using specific organic extractants to provide metal containing fluoborate solutions and/or metal containing solutions from which metals can be recovered.

2. Description of Related Art

The separation of metals from their ores or other materials such as sludges, concentrates, residues, waste products, baghouse dusts and the like is well known. Over the years, for example, lead has been produced from ores such as galena by thermal means such as roasting followed by smelting. Roasting causes environmental problems such as the emission of considerable amounts of lead and other metals and sulfur dioxide from sulfide ores and because of this hydrometallurgical processes have been developed.

One process for lead employs an aqueous solution of ferric chloride and sodium chloride to leach galena ore wherein the sulfur-containing residue of the ore is filtered off and the lead chloride obtained is electrolyzed. This process has some draw backs because lead chloride has a low solubility in water and salts such as sodium chloride are added to increase the solubility of the metals by forming the $PbCl_4^{-2}$ complex ion. The high chloride content leach causes the dissolving of nobler metals such as bismuth, silver and copper, however, which are then present in the solution as impurities. Further, the electrolysis of lead chloride in an aqueous solution does not yield a compact lead deposit but an incoherent sponge which falls to the bottom of the cell and remains impregnated with electrolyte.

A new hydrometallurgical process for producing electrolytic lead from galena is shown in U.S. Pat. No. 5,039,337 to M. Olper and P. Fracchia, which patent is hereby incorporated by reference. In this process galena is leached with an aqueous solution of ferric fluoborate and fluroboric acid with ferrous fluoborate, lead fluoborate and elemental sulfur being formed according to the reaction:

$2Fe(BF_4)_3 + PbS \rightarrow 2Fe(BF_4)_2 + Pb(BF_4)_2 + S$

The solid residue composed of elemental sulfur and galena gangue is filtered off and the solution of ferrous fluoborate and lead fluoborate is sent to a diaphragm electrolytic cell wherein pure lead is deposited at the cathode and at the anode ferrous ion is oxidized to ferric ion. The solution of ferric fluoborate regenerated at the anode is recycled to the leaching step. The lead produced by this process is of 99.99% lead purity and also forms a compact lead deposit which is smooth.

This particular process using a ferric fluoborate solution may also be used to leach other "impure" lead sources such as lead bullion, lead smelter speiss and matte and secondary lead materials such as from batteries. Similarly, for these processes, the lead source is leached to form a lead fluoborate and ferrous fluoborate solution which is then electrolyzed in a diaphragm electrolytic cell.

While the ferric fluoborate leaching process is a preferred method in the industry, impurities in the leach solution are a problem and are preferably removed and recovered before the electrolysis process. Impurities such as antimony, bismuth and tin are particularly troublesome and if not removed from the leach solution will result in an "impure" lead product being formed and other processing problems.

Other ores and metal containing materials are also desirably treated to separate and recover their metal values by hydrometallurgical processes. For example, the mineral tetrahedrite having the general formula $(Cu,Fe)_{12}Sb_4S_{13}$ is typically concentrated to form a material containing a mixture of copper and antimony sulfides with ancillary silver having the general formula $Cu_2S \cdot Sb_2S_3(+Ag_2S)$. A typical concentrate composition is, by weight, 20% Sb, 25% Cu, 2% Pb, 2% Zn, 2% As, 0.2% Bi, 25% S, 12% Fe and 700 ounces per ton Ag. Sulfide copper ores include bornite, chalcopyrite, chalcocite and covellite. Similarly, zinc concentrates, containing lead and/or copper sulfides and like materials are also desirably treated by hydrometallurgical processes to separate and recover their metal values.

It is therefore an object of the invention to provide a method for the treatment of metal containing materials by hydrometallurgical processes to separate and recover their metal values.

It is a further object of the invention to provide a method for the selective removal of metals as recoverable metals and/or impurities and in particular antimony, bismuth, zinc, copper, lead and tin from iron fluoborate solutions.

It is another object of the invention to provide a lead product produced by the method of electrolyzing an iron and lead fluoborate solution which has been treated to remove antimony, bismuth, tin and other metals and impurities from the solution.

Other objects and advantages of the present invention will be readily apparent from the following description.

SUMMARY OF THE INVENTION

It has now been discovered that ferric fluoborate solutions preferably containing fluroboric acid may be used to effectively extract metal values from ores, concentrates, sludges, residues, waste materials, baghouse dusts, smelter byproducts, mattes, reverts, slags and other such metal containing materials and that the resulting metal containing fluoborate solutions contain metals which may be selectively extracted with specially defined organic metal extractants to provide metal solutions from which metal values can be obtained. Ferric fluoborate has been found to be especially effective to extract metal values from a wide range of metal containing sources and the metals in the resulting fluoborate solution may be efficiently and economically extracted using specially defined organic extractants which provide high selectivity and high metal value solutions and recovered metal value products. For convenience, the term "ferric fluoborate" will include ferric fluoborate/fluroboric acid solutions.

In one aspect of the invention, the extraction of lead from an ore such as galena or other lead containing source using a ferric fluoborate solution, for example, it has now been discovered that antimony, bismuth and tin present in the ore whether as recoverable metal values or as impurities may be selectively removed from the lead containing fluoborate solution by using an extractant comprising organophosphoric acid ester compounds of the formula:

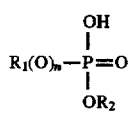

wherein $R_1$ is an alkyl group which contains 12 to 40 carbon atoms, $R_2$ is hydrogen or an alkyl group which contains 12 to 40 carbon atoms and n=0 or 1. When n=0, the esters are alkyl phosphonate esters. Phosphate esters are preferred.

The preferred esters are the mono phosphate esters (n=1 and $R_2$=hydrogen) with the most preferred ester being mono isooctadecyl phosphate. Mixtures of mono and di-isooctadecyl phosphate esters (n=1 and $R_1$=$R_2$) may be used with a preferred molar ratio of mono ester to di-ester being about 4:1. It is preferred that these materials be used as a solution in a water insoluble organic solvent such as kerosene or other similar hydrocarbon solvent to increase the efficiency of the extraction process.

In another embodiment, granulated lead bullion or other lead source containing copper, antimony, bismuth and/or tin is readily solubilized by a ferric fluoborate/fluroboric acid solution at room temperature. The resulting leach solution can then be treated according to the method of the invention to separate antimony, bismuth and tin. Copper may also be selectively extracted to produce a high copper containing solution from which a copper product may be obtained. The resulting lead fluoborate solution is subsequently electrowon forming high purity lead cathodes which meet ASTM specifications.

It has also been found that the selective organic extractants employed herein not only selectively remove metals from iron fluoborate solutions but that they are also stable with regard to hydrolysis in the aqueous phase and have minimal solubility in the aqueous phase.

In another aspect of the invention, the mineral tetrahedrite can be leached using a ferric fluoborate solution to extract Sb, Cu, Bi, Pb, Zn and As leaving a high value precious metals residue. The precious metals residue can be treated to recover the precious metals using known techniques. The fluoborate solution is contacted with a first organic extractant to selectively extract Sb and Bi which are then recovered. The remaining solution is then further contacted with the second organic extractant to selectively extract Pb and Zn and a significant amount of the copper, which metals are likewise separated from the second organic extractant and recovered. The remaining twice organic extractant contacted solution contains As and the remaining Cu and may be electrolyzed to form Cu and a Cu/As waste sludge. Ferrous fluoborate in the solution may be oxidized to ferric fluoborate and recycled to the tetrahedrite leaching step.

In a further aspect of the invention, other organic extractants found to be selective to extract metals from fluoborate solutions are alkyl salicylaldoxime (e.g., nonyl) which is selective for separating copper from iron fluoborate solutions and compounds containing the amidobis (thiophosphoryl) group which are selective for separating zinc, copper, cadmium and lead from iron fluoborate solutions.

DESCRIPTION OF THE PREFERRED EMBODIMENT(S)

The metal containing source may be any suitable material such as ores, concentrates, residues, wastes and includes tetrahedrite ore, tetrahedrite concentrate, zinc concentrates, slags, galena ore, lead bullion, lead smelter speiss and matte, lead concentrates and secondary lead such as obtained from batteries, copper ore and copper bearing materials. The metal containing source is preferably granulated or finely divided to enhance the leaching operation. For convenience, the following description will be mainly directed to a lead based metal containing material, however, it will be appreciated by those skilled in the art that the description will be applicable to other metals and metal containing materials.

The lead or other metal source is leached with a solution of ferric fluoborate containing preferably a stoichiometric amount of ferric ion to solubilize the metals to be leached and more preferably an excess amount and is generally about 20 to about 100 or 150 grams per liter (g/l) ferric ion, or more, preferably about 60 to about 100 g/l, e.g., 80 g/l ferric ion. The ferric fluoborate solution also preferably contains fluroboric acid in an amount of about 10 to about 20 weight percent or more of the leach solution, preferably 12 to about 18 percent.

The leach is usually conducted at room temperature but may vary from about 20° C. to any suitable temperature such as 40° C.–60° C. or higher depending on the leach time desired, the lead source and its physical shape. Leach time may vary widely and is usually about 5 minutes to 4 hours, or more usually about 1 to 3 hours.

After leaching, the lead/leachant mixture is filtered. The filtrate contains ferrous fluoborate, lead fluoborate and a small amount of unreacted ferric fluoborate and fluroboric acid, if any, and metals as impurities including antimony, bismuth and tin. Usually, the impurity levels will vary with antimony up to about 10 g/l, bismuth up to about 1 g/l and tin up to about 1 g/l, although higher or lower amounts may be present.

The filtrate (leachant) solution is now contacted with an organic extractant of the invention to remove (extract) the metal (or impurities) of the solution into the organic extractant phase with the treated (purified) aqueous solution phase then being electrolyzed to produce the lead product. Contact of the organic extractant phase and the filtrate (solution) phase may be made by known means such as liquid extraction columns with the loaded organic solvent extract phase and the aqueous phase then being separated into two distinct phases. The contact time may vary widely and is usually a few minutes, e.g., 1–5, up to about one hour or more in duration. The temperature of the extraction is about 20° to about 40° C., preferably 25° to about 30° C. although lower or higher temperatures may be employed.

In a preferred embodiment, the loaded organic phase is stripped of the extracted impurities by contact with an acid such as HCl or $HBF_4$ with the stripped organic phase being recycled back to the extraction step. The removed impurities are recovered from the stripping solution by known refining operations, such as neutralization. A preferred regeneration (stripping) procedure uses a dilute HCl solution containing a chloride salt with the matching cation being preferably an alkali metal or alkaline earth metal or ammonium having a chloride content of at least 4 molar whereby the organic extractant complex is regenerated and the extracted metal ions are transferred to the aqueous stripping solution.

The remaining treated (contacted) aqueous lead fluoborate leachant phase is now electrolyzed using well known techniques for this type material as set forth in U.S. Pat. No. 5,039,337 supra to produce a lead product containing up to 99.99% lead or more. Basically, the treated aqueous leachant solution is sent to a diaphragm electrolytic cell wherein pure lead is deposited at the cathode and the solution, partially deprived of lead, is sent to the anodic compartment wherein the oxidation of ferrous fluoborate to ferric fluoborate takes place. The regenerated solution of ferric fluoborate is recycled to the leaching step.

One organic extractant useful in the invention is an organic phosphate or phosphonate ester defined as follows:

wherein $R_1$ is an alkyl group which contains 12 to 40 carbon atoms, $R_2$ is hydrogen or an alkyl group which contains 12 to 40 carbon atoms, and $n=0$ or 1.

$R_1$ and $R_2$ alkyl radicals are preferably branched containing 12 to 40, preferably 12 to 30 and more preferably 16 to 24 carbon atoms. Especially preferred branched alkyl radicals which may be represented by $R_1$ and $R_2$ are radicals of the formula:

wherein $R_3$ and $R_4$ are straight-chain or branched alkyl radicals which together contain at least 14 carbon atoms and wherein $R_3$, in general, contains 2 more carbon atoms than $R_4$. Preferred radicals of Formula II include radicals wherein $R_3$ is nonyl and $R_4$ is heptyl, especially the 2-(1,3,3-trimethylbutyl)-5,7,7-trimethyloctyl radical of the formula:

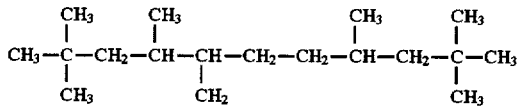

Other useful branched alkyl radicals which may be represented by $R_1$ and $R_2$ in the compounds of Formula I are derived from mixtures of higher alcohols of Formula II wherein $R_3$ and $R_4$ do not necessarily differ by 2 carbon atoms.

Inert substituents which may be present on the above defined alkyl radicals include halogen, especially chlorine and bromine and alkoxy, especially lower alkoxy such as methoxy and ethoxy.

The compounds of Formula I may be obtained by methods described in the prior art for the production of alkylphosphonic acids and mono-alkyl esters of phosphoric acid. For example, the esters may be made by reacting phosphoric acid, $P_2O_5$ or pyrophosphoric acid with isooctadecanol.

The above esters are disclosed in EP 562,709-A2, published Sep. 29, 1993 which priority is claimed from U.K. Application Nos. 9204020.3 and 9204018.7, both filed on Feb. 25, 1992. The esters were found to be useful for removing antimony and bismuth from copper refinery electrolyte. Extractant regeneration methods are also disclosed therein.

The ester may also be encapsulated within a polymeric film so as to form small spherical particles as described in U.S. Pat. No. 4,500,494 or may be present on a porous substrate such as aluminum silicate, magnesium silicate, magnesium-aluminum silicate, aluminum oxide, silica or a chelating resin. The antimony, bismuth and tin are then removed by contacting the iron and lead fluoborate solution with the ester containing substrate.

Stripping of the metal values from the porous substrate or the chelating resin may be effected by eluting the substrate or resin with an aqueous solution as described above in a conventional manner.

While each ester may be employed in its pure form, it is preferred for some applications to use mixtures of the esters.

Mole ratios of mono ester to di ester range from about 10:1 to 1:10, with it being preferred that the ratio be about 5:1 to 1:1. A highly preferred mixture comprises a mono ester to di ester ratio of 4:1. A preferred isooctadecanol alcohol to prepare the ester is isooctadecan - 1 - ol.

The esters are solubilized in an organic solvent substantially insoluble in water such as kerosene as a carrier to facilitate the extraction process. Solvents include aliphatic, cycloaliphatic and aromatic hydrocarbons. In general, the amount of ester in the organic phase may be up to 5 molar and above with an amount of about 0.25 to 1 molar being preferred. A highly preferred concentration is about 0.5 to 0.75 molar. To enhance phase separation, a modifier such as tridecylalcohol may be used in amounts of about 5 volume percent, although greater or lesser amounts may be used.

With regard to the amount of the organic extractant phase and leachant phase to be contacted, this ratio may also vary widely with a volume ratio of organic phase to leachant phase being about 5:1 to 1:5. Usually a ratio of 3:1 to 1:3 is used with a ratio of 1:1 being preferred.

For minerals such as tetrahedrite and other metal containing sources, the fluoborate leach solution will contain metal values in different concentrations than in leach solutions resulting from the above described lead materials. For tetrahedrite, the leach solution will contain a significant amount of Sb (about 30 g/l) and Cu (about 35 g/l) and lower amounts of Pb (about 2 g/l), zinc (about 2 g/l), bismuth (about 3 g/l) and arsenic (about 3 g/l). For this type material, the fluoborate leach solution is preferably contacted with the above organic phosphate or phosphonate ester (first organic extractant) to selectively remove Sb and Bi from the fluoborate solution. The organic extractant is stripped of antimony and bismuth and recycled to contact the tetrahedrite leach solution. A stripping solution of a strong acid such as HCl may be used and Bi may be removed and recovered from the solution by molecular recognition technology. The Sb rich solution may be electrolyzed to produce a commercial Sb product.

The fluoborate solution remaining after contact with the first organic extractant contains a large amount of Cu (about 30 g/l) and lesser amounts of As (about 2 g/l), Pb (about 2 g/l) and Zn (about 1.5 g/l). Zn and Pb and part of the Cu can be extracted from the remaining fluoborate solution using a second organic extractant containing the amidobis (thiophosphoryl) group as defined hereinbelow. Cu, Pb and Zn are stripped from the second organic extractant by a strong acid such as 50% volume HCl and Pb and Zn may be later removed from the resulting strip solution. For example, Pb may be removed by precipitation with $H_2SO_4$.

The fluoborate solution remaining after contact with the second organic extractant contains the unextracted Cu and As and may then be electrolyzed to provide a Cu product, Cu/As sludge and a ferrous fluoborate solution. The ferrous fluoborate may then be oxidized to ferric fluoborate and recycled to the metal source (tetrahedrite) leaching step.

Another application for the invention is the direct recovery of zinc from high grade zinc concentrates as follows:

$ZnS(s)+2Fe(BF_4)_3(aq)\rightarrow Zn(BF_4)_2(aq)+2Fe(BF_4)_2(aq)+S(s)$

The fluoborate leachant solution containing both zinc, iron and metal contaminants is contacted with an organic extractant containing the amidobis(thiophosphoryl) group to selectively remove (extract) zinc and the zinc stripped from the organic extractant to provide a zinc solution suitable for electrowinning. Zinc may be stripped from the organic extractant by a strong acid such as 50% volume HCl to provide such a solution.

High grade lead concentrates typically contain >70% lead and some zinc. Any zinc in the ore used to form the concentrate is conventionally made into a separate zinc concentrate. The lead concentrate may be leached with a ferric fluoborate solution to leach the lead and zinc. The leachant may be directly electrowon to recover lead and the zinc recovered by other conventional means.

The zinc concentrate may be leached with a ferric fluoborate solution to leach the zinc and lead. Lead may be removed by, e.g., precipitation, and the zinc electrowon.

Many of the world concentrates are high in both lead and zinc and contain significant quantities of iron. The processes described above for the lead/zinc concentrates can likewise be used for these concentrates but a bleed for iron from the residual fluoborate solution will most likely be required as will be understood by those skilled in the art.

Concentrates containing chalcopyrite ($CuFeS_2$) with a significant amount of zinc (~5%) can be leached with a ferric fluoborate solution to dissolve copper, iron and zinc. Contacting of the leach solution with an organic extractant containing the amidobis(thiophosphoryl) group will remove zinc and some of the copper for recovery of zinc by electrowinning. The remaining copper/iron solution would be suitable feed for electrowinning of copper by the FLU-BOR process. Again a bleed for iron from the residual fluoborate solutions will be required. It is preferred that copper be extracted first from the leachant solution using, e.g., nonyl salicylaldoxime, and, the copper then stripped from the organic extractant and recovered. The remaining ferric fluoborate solution containing zinc could then be electrowon to recover the zinc.

Baghouse dusts which typically contain about 30% Pb, 15% Zn and 15% Cd may be leached with ferric fluoborate to dissolve lead, zinc and cadmium. Extraction of the leach solution with an organic extractant containing the amidobis (thiophosphoryl) group will remove zinc, lead and cadmium for recovery by conventional technologies for zinc and cadmium. The lead could be removed first by precipitation and the zinc and cadmium recovered from the solution. Any remaining lead in the residual fluoborate solution would be recovered by the FLUBOR process using the diaphragm electrolysis cell as discussed above.

Unfumed lead slags contain both lead and zinc as metals of value. When leached with ferric fluoborate the lead, zinc and also the iron in the slag will dissolve. Extraction of the leach solution with as organic extractant containing the amidobis(thiophosphoryl) group will extract zinc and lead. Any unextracted lead in the residual fluoborate solution can be recovered by the FLUBOR process. Lead may be recovered from the solution used to strip the organic extractant by precipitation and the zinc then recovered by electrowinning. Again a bleed for iron will most likely be required.

The alkyl salicylaldoxime organic extractant may be represented by the general formula:

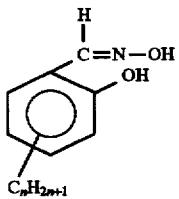

wherein n is 4 to 15, preferably 8 to 12 and most preferably 9 (nonyl). The alkyl salicylaldoxime may be substituted with halogens, etc. as will be appreciated by those skilled in the art.

The organic extractant containing the amidobis (thiophosphoryl) group is described in U.S. Pat. No. 5,393,431, which patent is hereby incorporated by reference. The compounds are described as being highly effective in selectively extracting zinc (II) from acidic aqueous solutions such as $H_2SO_4$ containing both zinc (II) and iron (III) ions. The extractant may be represented by the following formula:

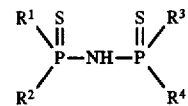

wherein each of $R^1$, $R^2$, $R^3$ and $R^4$, independently, represents an optionally substituted hydrocarbyl or hydrocarbyloxy group or $R^1$ and $R^2$ together with the attached phosphorus atom and/or $R^3$ and $R^4$ together with the attached phosphorus atom forming a 5- to 8- membered heterocyclic ring.

Optionally substituted hydrocarbyl and optionally substituted hydrocarbyloxy groups which may be represented by $R^1$, $R^2$, $R^3$ and $R^4$ comprise optionally substituted alkyl, branched alkyl, alkoxy, branched alkoxy, aryl and aryloxy groups including any combination of these, for example optionally substituted aralkyl and alkaryl groups.

As examples of optionally substituted alkyl and alkoxy groups which may be represented by $R^1$, $R^2$, $R^3$ and $R^4$, there may be mentioned groups in which the alkyl or alkoxy moieties each contain from 1 to 20, for example from 1 to 10, carbon atoms. As examples of optionally substituted aryl and aryloxy groups, there may be mentioned optionally substituted phenyl and phenoxy groups.

Secondary alkyl and alkoxy groups are preferred such as 2-butyl and 2-pentyl. For ease of manufacture it is preferred that $R^1$ is the same as $R^2$ and $R^3$ is the same as $R^4$. A preferred extractant comprises $R^1$, $R^2$, $R^3$, and $R^4$ each being 2-pentyl.

The invention is further illustrated by the following examples, which are not intended to be limiting.

EXAMPLE 1

53 pounds of granulated lead bullion containing, by weight, about 81.0% lead, 0.47% bismuth, 1.7% antimony and 0.41% tin were leached for 3 hours at 28° C. in 175 liters of a combined ferric fluoborate (80 g/l ferric ion)/fluroboric acid (17 weight %) solution. The mixture was filtered and the filtrate (leachant) contained about 98 g/l lead, 1.7 g/l antimony, 0.5 g/l bismuth, and 0.5 g/l tin. 100 ml of this leach solution was contacted with 100 ml of an extractant solution containing 1 mole of a 4:1 mole ratio mono/di isooctadecyl phosphate ester mixture in a kerosene solvent by shaking the two immiscible phases together for 5 minutes. After phase separation, the aqueous phase was analyzed and the results are as follows:

TABLE 1

| ELEMENT | BEFORE EXTRACTION (g/l) | AFTER EXTRACTION (g/l) |
|---|---|---|
| Ag | .0008 | .0008 |
| As | 0.77 | 0.77 |
| Au | <.0005 | <.0005 |
| Bi | 0.50 | 0.009 |
| Cu | 2.95 | 2.95 |
| Ni | 0.057 | 0.057 |
| Sb | 1.74 | 0.15 |
| Sn | 0.52 | 0.007 |
| Te | 0.03 | 0.027 |

The data show 98.2% extraction of the bismuth, 91.4% extraction of the antimony and 98.6% extraction of the tin. Note that the extraction is selective for these impurities since the other elements in the filtrate are not significantly affected.

The primary constituent of the filtrate, lead, is also not significantly affected.

EXAMPLE 2

A ferric fluoborate (25 g/l ferric ion)/fluroboric acid (15–20 weight percent) solution was used to leach primary lead bullion leach residue. The extractant was nonyl salicylaldoxime which was diluted to 25 vol. % with SX7 kerosene. A volume ratio of 1:1 was used and the residue and extractant mixed for 5 minutes at room temperature. The results are as follows:

TABLE 2

| Element | LEACHANT SOLUTION Conc. (gpl) | EXTRACTANT SOLUTION Conc. (gpl) |
|---|---|---|
| Ag | <0.005 | <0.005 |
| As | 1.42 | 1.47 |
| Au | <0.005 | <0.005 |
| Bi | 0.098 | 0.099 |
| Cu | 7.10 | 4.91 |
| Fe | 27.7 | 28.1 |
| Ni | 0.107 | 0.109 |
| Pb | 2.36 | 2.42 |
| Sb | 2.89 | 3.01 |
| Sn | 0.292 | 0.304 |

As can be seen from Table 2, only copper was selectively extracted from the fluoborate solution.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. A method for producing a lead product from a lead containing material containing at least one of antimony, bismuth or tin comprising:

leaching the lead containing material with a solution of ferric fluoborate in fluoboric acid to dissolve lead and forming a leach solution containing lead and at least one of antimony, bismuth or tin;

separating solids from the leach solution;

extracting at least one of antimony, bismuth or tin from the leach solution by contacting the leach solution with an organic extractant comprising:

organophosphoric acid ester compounds of the formula:

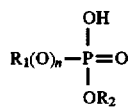

wherein $R_1$ is an alkyl group which contains 12 to 40 carbon atoms, $R_2$ is hydrogen or an alkyl group which contains 12 to 40 carbon atoms, and n=0 or 1 and forming a lead containing extracted leach solution and an organic extractant solution containing at least one of extracted antimony, bismuth or tin;

separating the extracted leach solution from the organic extractant solution; and electrolyzing the extracted leach solution to form the lead product.

2. The method of claim 1 wherein the extractant is dissolved in an organic solvent.

3. The method of claim 2 wherein the organic solvent is kerosene.

4. The method of claim 2 wherein the organic extractant is isooctadecyl monophosphate ester.

5. The method of claim 2 wherein the organic extractant is isooctadecyl diphosphate ester.

6. The method of claim 2 wherein the organic extractant is a mixture of isooctadecyl monophosphate ester and isooctadecyl diphosphate ester in a mole ratio of mono ester to diester of about 5:1 to 1:1.

7. The method of claim 1 wherein $R_1$ is an alkyl group which contains 16 to 24 carbon atoms and $R_2$ is hydrogen or an alkyl group which contains 16 to 24 carbon atoms.

8. The method of claim 1 wherein $R_1$, is a branched alkyl radical and $R_2$ is hydrogen or a branched alkyl radical.

9. A method for treating a metal bearing material containing at least one metal from a first group of copper, zinc and lead and at least one metal from a second group of antimony, bismuth and tin, to separate and recover at least one metal from each group comprising:

leaching the metal bearing material with a solution of ferric fluoborate/fluoboric acid to dissolve at least one metal from the first group and at least one metal from the second group to form a metal containing iron fluoborate leach solution;

separating solids from the leach solution;

contacting the leach solution with a first organic extractant to remove antimony, bismuth or tin from the leach solution into the first organic extractant to form a first remaining leach solution and a first organic extractant solution, the first organic extractant comprising organophosphoric acid ester compounds of the formula:

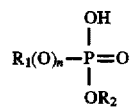

wherein $R_1$ is an alkyl group which contains 12 to 40 carbon atoms, $R_2$ is hydrogen or an alkyl group which contains 12 to 40 carbon atoms, and n=0 or 1;

separating the first remaining leach solution from the first organic extractant solution;

recovering at least one of copper, zinc or lead from the first remaining leach solution by electrowinning or by contacting the first remaining leach solution with a second organic extractant to remove at least one of copper, zinc or lead and forming a second remaining leach solution and a second organic extractant solution, the second organic extractant comprising a compound containing the amidobis(thiophosoryl) group or a compound comprising:

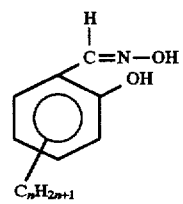

wherein n is 4 to 15; and stripping the second organic extractant solution to remove copper, zinc or lead to form a second recovered metal solution.

10. The method of claim 9 wherein the second remaining leachant solution contains copper and is electrolyzed to produce a copper product and an iron fluoborate solution.

11. The method of claim 9 wherein the first and second organic extractants are dissolved in an organic solvent.

12. The method of claim 11 wherein the organic solvent is kerosene.

13. The method of claim 11 wherein the first organic extractant is isooctadecyl monophosphate ester.

14. The method of claim 11 wherein the first extractant is isooctadecyl diphosphate ester.

15. The method of claim 11 wherein the first organic extractant is a mixture of isooctadecyl monophosphate ester and isooctadecyl diphosphate ester in a mole ratio of mono ester to diester of about 5:1 to 1:1.

16. The method of claim 9 wherein $R_1$ is an alkyl group which contains 16 to 24 carbon atoms and $R_2$ is hydrogen or an alkyl group which contains 16 to 24 carbon atoms.

17. The method of claim 9 wherein $R_1$ is a branched chain alkyl radical and $R_2$ is hydrogen or a branched chain alkyl radical.

18. The method of claim 9 wherein the metal source is tetrahedrite.

19. The method of claim 9 wherein the second organic extractant is represented by the following formula:

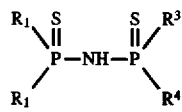

wherein $R^1$, $R^2$, $R^3$ and $R^4$ are independently selected from the group consisting of alkyl and alkoxy groups of 1–20 carbon atoms.

20. The method of claim 19 wherein $R^1$, $R^2$, $R^3$ and $R^4$ are each 2-pentyl.

21. A method for separating antimony, bismuth or tin from a metal bearing material containing copper, zinc or lead comprising:

leaching the metal bearing material with a solution of ferric fluoborate/fluoboric acid to form a leach solution containing at least one of antimony, bismuth or tin and at least one of copper, zinc or lead;

contacting the leach solution with an organic extractant to form an organic extractant solution containing at least one of antimony, bismuth or tin and an extracted leach solution containing at least one of copper, zinc or lead, the organic extractant comprising organophosphoric acid ester compounds of the formula:

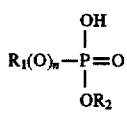

wherein $R_1$ is an alkyl group which contains 12 to 40 carbon atoms, $R_2$ is hydrogen or an alkyl group which contains 12 to 40 carbon atoms, and n=0 or 1; and separating the organic extractant solution and the extracted leach solution.

22. A method for separating copper from a metal bearing material containing at least one metal of zinc, lead, antimony, bismuth or tin comprising:

leaching the metal bearing material with a solution of ferric fluoborate/fluoborate acid to form a leach solution containing copper and at least one of the other above metals;

contacting the leach solution with an organic extractant to form an organic extractant solution containing copper and an extractant leach solution containing at least one of the above metals, the organic extractant comprising:

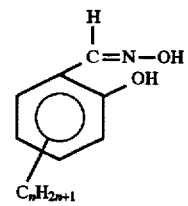

wherein n is 4 to 15; and separating the organic extractant solution from the extracted leach solution.

23. The method of claim 22 wherein the metal containing material is a tetrahedrite concentrate and the extracted leach solution contains antimony and is contacted with an organic extractant to remove antimony from the extracted leach solution, the extractant comprising organophosphoric acid ester compounds of the formula:

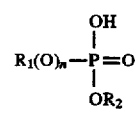

wherein $R_1$ is an alkyl group which contains 12 to 40 carbon atoms, $R_2$ is hydrogen or an alkyl group which contains 1 2 to 40 carbon atoms, and n=0 or 1.

24. A method for separating copper, zinc or lead from a metal bearing material containing antimony, bismuth or tin comprising:

leaching the metal bearing material with a solution of ferric fluoborate/fluoboric acid to form a leach solution containing at least one of copper, zinc or lead and at least one of antimony, bismuth or tin;

contacting the leach solution with an organic extractant to form an organic extractant solution containing at least one of copper, zinc or lead and an extracted leach solution containing at least one of antimony, bismuth or tin, the organic extractant comprising a compound containing the amidobis(thiophosoryl) group; and separating the organic extractant solution from the extracted leach solution.

25. The method of claim 24 wherein the metal containing material is a zinc concentrate.

* * * * *